US005559325A

United States Patent [19]

Franzen

[11] Patent Number: 5,559,325

[45] Date of Patent: Sep. 24, 1996

[54] METHOD OF AUTOMATICALLY CONTROLLING THE SPACE CHARGE IN ION TRAPS

[75] Inventor: Jochen Franzen, Bremen, Germany

[73] Assignee: Bruker-Franzen Analytik GmbH, Bremen, Germany

[21] Appl. No.: 286,672

[22] Filed: Aug. 5, 1994

[30] Foreign Application Priority Data

Aug. 7, 1993 [DE] Germany .......................... 43 26 549.9

[51] Int. Cl.$^6$ .......................... G01D 59/44; H01J 49/00

[52] U.S. Cl. .......................... 250/282; 250/292

[58] Field of Search .......................... 250/292, 282

[56] References Cited

U.S. PATENT DOCUMENTS 4,540,884 9/1985 Stafford et al. .......................... 250/282
4,771,172 9/1988 Weber-Grabau et al. .............. 250/282
5,107,109 4/1992 Stafford, Jr. et al. .................... 250/282
5,367,162 11/1994 Holland et al. .......................... 250/283

FOREIGN PATENT DOCUMENTS 0292187 9/1987 European Pat. Off. .
0237268 11/1988 European Pat. Off. .

*Primary Examiner*—Bruce C. Anderson

[57] ABSTRACT

The invention relates to a method of automatically controlling the space charge in ion traps when they are used as a mass spectrometer. If ionization conditions remain the same, space charge is proportional to the measured concentration of a substance; if there are rapid changes in substance concentrations, as can be found in coupling with gas chromatography for example, the space charge must be controlled to obtain spectra of consistent quality. The invention is based on the possibility of performing rapid consecutive scans and consists in utilizing the integrated ion currents of consecutive spectra to forecast by calculation the value of the ion generation rate at the time of the ionization phase for the next scan. Calculation may be based on linear, quadratic or cubic extrapolation but also on assumptions regarding the function of change of the concentration, and an adaptation of the function parameters.

12 Claims, 1 Drawing Sheet

METHOD OF AUTOMATICALLY CONTROLLING THE SPACE CHARGE IN ION TRAPS

FIELD OF THE INVENTION

This invention relates generally to ion traps and, more specifically, to a method of automatically controlling space-charge in ion traps when they are used as a mass spectrometer.

BACKGROUND OF THE INVENTION

The generation of ions for storage in mass-spectrometric ion traps is dependent on the concentration of the substances to be ionized. The ion trap mass spectrometer is, as are other mass spectrometers, frequently coupled to chromatographic processes of separation which naturally cause extreme fluctuations in the flow of carrier gas. However, methods which produce substance vapors in bursts, such as pyrolysis or evaporators, also produce extreme fluctuations in concentration.

If ion traps are used as mass spectrometers, the maximum number of ions which can be stored at any one time must not go beyond a very sharply defined limit or else the mass spectrum will deteriorate in two respects:

Firstly, the mass lines of the spectrum compared with a correct calibration are displaced by more than a few tenths of an atomic mass unit; and Secondly the mass lines become wider as mass resolving power declines.

The reason for these effects is the ion-generated space charge which impairs the functioning of the ion trap.

On the other hand, the number of ions which are available for measuring a spectrum below the space-charge limit is relatively low. Depending on the type of ion trap there are only about 1,000 to 10,000 ions available per spectrum for measuring the entire spectrum with all its mass lines. Consequently the dynamic range of measurement within a spectrum is very small and is only scarcely 2 to 3 orders of magnitude. For scanning a mass spectrum, however, measurement of weak mass lines down to 0.1% is normal, which is usually only successful in ion traps if a number of spectra are added together. Even in such a case, precision can not be expected to be good for measuring the weak mass lines. The dynamic range is still barely adequate to measure two substances which are inside the ion trap at the same time and which have different concentrations.

For this reason it is necessary to optimally utilize the maximum number of ions before the space-charge limit is reached.

As already known from the similar case of ion cyclotron resonance mass spectrometry (ICR), it is useful to control the generation of ions so that the spacecharge limit is just not reached.

For this type of control a variable must be measured which is representative of the space charge (or rather, of the number of ions stored), and which can be used for automatic control purposes. As the considerable fluctuations in concentration cannot be forecast quantitatively, it has proved to be a reasonable aim to control a tolerance interval which is approximately between the space-charge limit itself and a value which is about 20% below the space-charge limit. For this it is necessary to accurately know the generation rate of ions at the time of ionization for scanning to within about 10%.

Automatic control of the number of ions is already known for ion traps. U.S. Pat. No. 5,107,109 describes the type of control system for generating the items by electron impact in ion traps, and U.S. Pat. No. 4,771,172 describes an equivalent control system for chemical ionization. In both cases, generation of the ions for measurement of the spectrum is initially preceded in a preliminary phase by measurement of ion generation rate. In the preliminary phase an initial ionization takes place with a short, constant ionization time under constant ionization conditions. After a deceleration time for the ions created in which they collect at the center of the ion trap, the ions thus generated in the preliminary phase are ejected from the ion trap in a brief ejection process and measured in an integrating process. Using the quantity of ions thus measured in the preliminary phase, an ionization time is then calculated which produces an optimal number of ions in the ion trap for the subsequent scanning phase. The ion trap is then completely emptied until the preliminary phase is terminated. It is reset and then filled with ions in the second ionization process proper for the scanning phase.

European Patent EP-B 10 237 268, which is based on the priority of the application of U.S. Pat. No. 5,107,109, even places automatic control of the space charge in ion traps as such under protection without any specific reference to a measurement of the actual values, and not only the method of preliminary phase measurement of the claim granted in U.S. Pat. No. 5,107,109.

Control of the ionization process resulting from automatic control of space charge is, in practice, usually related to the duration of ionization, whereby the intensity of ionization is kept constant. In the case of electron impact ionization the electron beam is kept constant and the time the electron beam is allowed to act on the substance is limited by an electron beam switch (shutter). Control of duration can easily extend over a wide range and in practice it covers approximately 3.5 powers of ten from 5 microseconds to 20 milliseconds. Although it would be possible to control the intensity of the electron beam as well, it would be difficult and this has so far not been applied.

Automatic control of the number of ions in ion traps by measuring the ion generation rate beforehand has produced a significant improvement in the spectra from chromatographic separations. Displacement of the mass lines was kept within limits and the mass resolving power largely remained constant. However, measurement of the generation rate in a preliminary phase still has considerable disadvantages in very fast chromatography.

Between generation of the ions in the preliminary phase and generation of the ions for the scanning phase there are about 10 milliseconds. Activites to be perfomed within this time include, consecutively, ion deceleration, ion ejection with measurement, emptying of the ion trap, and resetting. On the other hand, the concentration can already change easily by a factor of 2 in 10 milliseconds if fast chromatography is used with narrow peaks. In the case of chemical ionization the relationships are much less favorable because the time between the two ionization phases is much longer.

Also, in the preliminary phase the space-charge density is naturally not controlled. However, the levels of concentration can easily change in a chromatogram over 4 to 6 powers of ten (measured above the noise background). Depending on the prevailing concentration, the number of ions formed in the preliminary phase can be so small that measurement of the generation rate has a large degree of uncertainty. On the other hand, the number of ions formed may be so large that the space-charge limit is already considerably exceeded and the ejection process, and hence measurement of the generation rate, is already impaired. In both cases an incorrect or uncertain value for ion generation rate impairs calculation of the optimal ionization time for the subsequent ionization phase for scanning.

Therefore, It is among the objects of the present invention to control generation of the ions in an ion trap used for mass spectrometry in such a way that an optimal number of ions is formed and stored below the space-charge limit. As used herein, the term "space-charge limit" means the number of ions above which a considerable deterioration in spectra can be observed. This number of ions can be defined in a preceding calibration process. In particular it should be possible to accurately control the ions stored for scanning to within a few percent, even if there are considerable temporal changes in substance concentrations, as occur in fast chromatography.

SUMMARY OF THE INVENTION

The invention relates to a method of obtaining a mass spectrum of a sample. Specifically, ions from the sample are generated and stored in an ion trap prior to carrying out successive mass scans on those ions. Compensation for changes in concentration of the substance to be analysed are achieved by measuring the integrated ion currents in successive mass scans and determining the ion generation rate. The expected ion generation rate for a subsequent mass scan is calculated by extrapolation of the generation rates determined in at least two preceding mass scans, while the ion generation process is controlled in dependence upon the calculated expected ion generation rates.

By special scanning methods it has become possible to considerably increase the number of mass spectra scanned per second in ion traps. Whereas according to the method described in U.S. Pat. No. 5,548,884 regarding "mass selective instability scans" it was possible to scan about 5 to a maximum of 10 spectra per second, if non linear resonances (U.S. Pat. No. 4,882,484 and U.S. Pat. No. 4,975,577) are used, the number of spectra is increased to 20 to 50 spectra per second (depending on the length of ionization time and the mass range) because the scanning rate can be increased from about 5,000 to about 30,000 atomic mass units per second. Modern electronics allows digitizing and totalizing of the measured values for the spectrum immediately so that directly after measurement a digital value is available for the integrated ion current over the entire spectrum. With these methods it is possible, applying knowledge about the intensity and duration of ionization, to obtain data about the generation rates of the ions at intervals of 50 down to 20 milliseconds, the generation rates being proportional to the levels of concentration.

More specifically, the invention estimates the unknown generation rate for an ionization process by extrapolating a number of previous values of generation rates. Even after only two measurements it is possible to perform linear extrapolation. Such linear extrapolation from values which are each 20 milliseconds apart usually produces better forecast values then the above-mentioned method in which the value determined in the preliminary phase is assumed to be constant for at least 10 milliseconds. There are further improvements to be found in using a number of measurements: with three preceding scans it is possible to perform a quadratic extrapolation, and from 4 scans a cubic extrapolation.

It is a further advantage of this method that no measurements other than the scans have to be performed. The measured values for control purposes are generated by the useful measurements themselves. Another advantage is that with this method the measurements are always within the optimal range of the number of stored ions and are therefore always in the region of maximum reliability.

An extension of this method can also take into account measurement noise. If a quadratic or cubic method of extrapolation is performed by more than the necessary three or four points and averaged thereby, noise components are averaged out. In practice, however, the total ion currents determined by integration over the spectrum are extremely accurate and manifest only little noise. For this reason averaging generally brings about no further improvements unless the noise is concentration noise.

The calculations for these extrapolations are simple and can be easily performed with fast processors in the time required for a complete emptying of the ion trap before the next ionization period begins (about 1 millisecond).

If the characteristic of concentration change is fundamentally known, and if only a few parameters are necessary to define the function, even the known function may be applied for extrapolation. The method then amounts to adapting the function parameters to the characteristic so far, whereby the adapted parameters are applied to calculate the next value in advance. Here too, noise can be averaged out if more points are used than absolutely essential.

In chromatography, for example, the concentration change in a chromatographic peak with an approximation which is certainly good enough here, may be regarded as a Gaussian curve. Adaptation of the two parameters, maximum height and half-value width, permits calculation of the next value in a manner which is excellent for the present purpose. One must bear in mind that adaptation must not necessarily define the entire curve well but solely the next value of the ion generation rate.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1A:
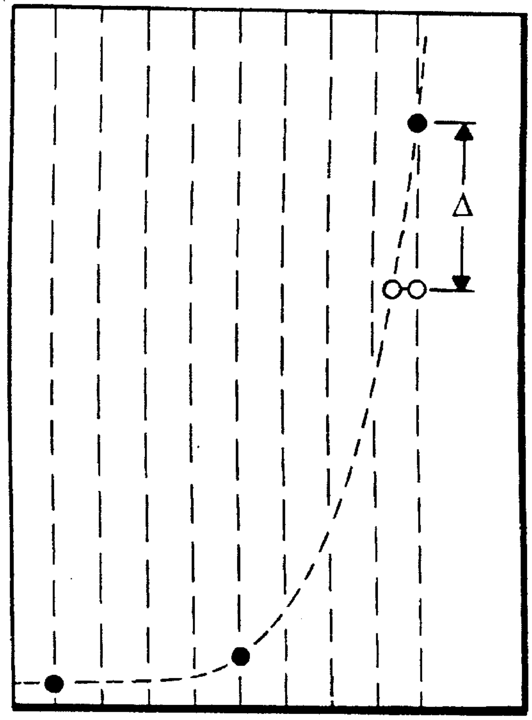
FIGS. 1A–1D show different types of automatic control, each applying to the initial rise phase of a chromatographic peak having an approximately exponential increase in concentration.
Figure 1B:
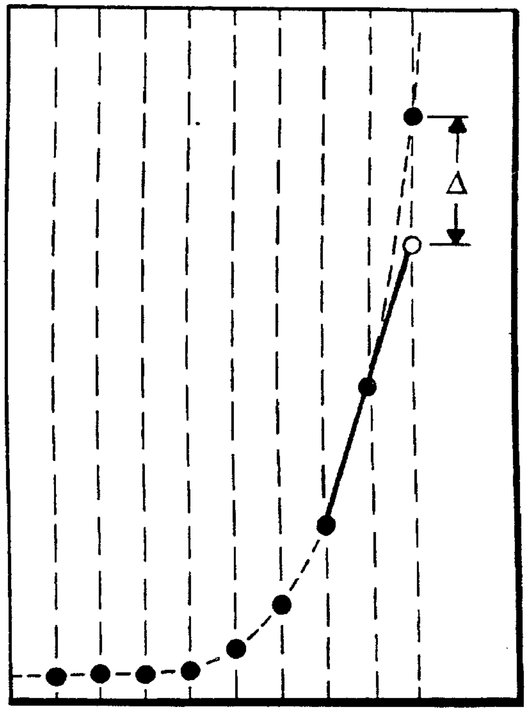
Figure 1C:
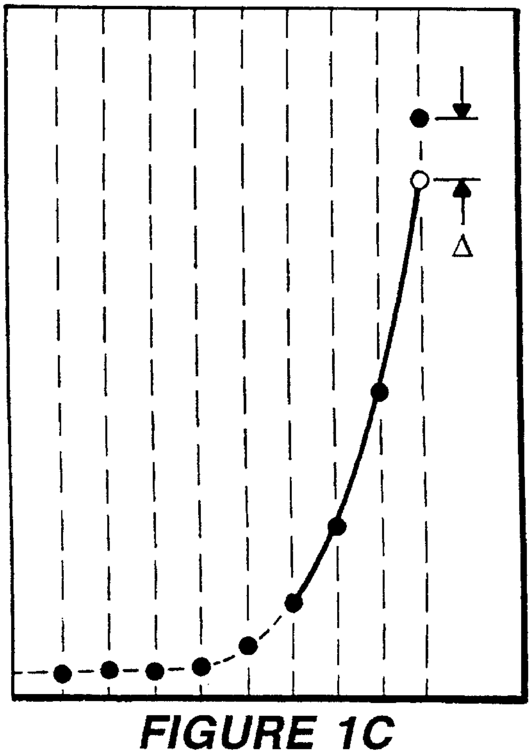
Figure 1D:
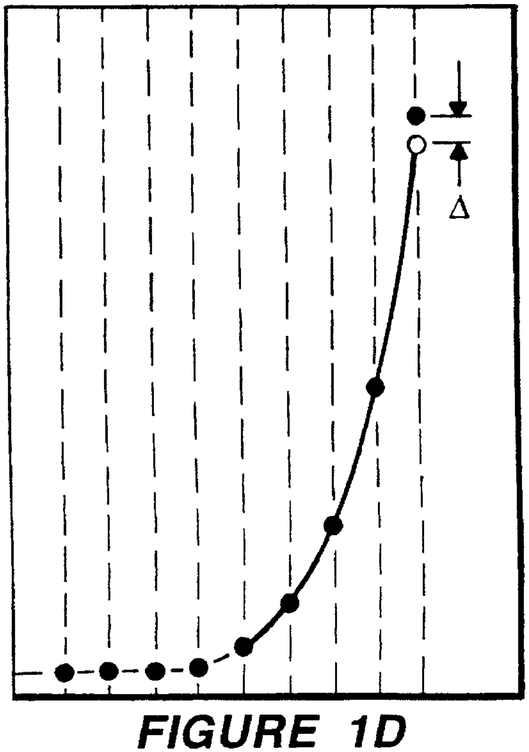

Referring to the drawings, FIGS. 1B to 1D show measurements of a integral ion current of the spectra at an interval of about 20 milliseconds, while the measurements shown in FIG. 1A reflect a scanning rate of 80 milliseconds. The vertical broken lines indicate the scanning rate with an interval of 20 milliseconds in each case. The rise of approximately 80% increase per 20 milliseconds corresponds approximately to a chromatographic peak with a half-value width of 1 second.

Specifically, FIG. 1A shows the control by a measurement of ion generation rate in the preliminary phase, with an interval of 10 milliseconds between the ionization processes of the preliminary phase and the scanning phase. The generation rate thus determined is approximately 30% below the optimal value, which is naturally equal to the true value of the generation rate. The difference is marked by "Δ". One must bear in mind that as the concentration declines in the final phase of the peak the generation rates thus determined must lead to ion fillings above the optimal value. This fact must be taken into consideration in methods of this type by allowing a large safety tolerance so that with this method a considerable distance from the optimal value must be maintained. This type of measurement with a preliminary phase is unrealistic for measurement at a rate of 20 milliseconds so only the measurements at a rate of 80 milliseconds are plotted. Even this scanning rate is still too fast for the method of "mass-selective instability Scan".

FIG. 1B shows the relationships for linear extrapolation and a constant scanning rate of 20 milliseconds. The precalculated value is only about 25% below the optimal value. Here too there may be values above the optimal value even though they may be at different points of the peak than with the previous method. For this reason a considerable safety tolerance must be maintained here too. Under the selected circumstances, linear extrapolation is not much better than measurement in a preliminary phase but it saves the time of preliminary phase measurement.

The quadratic and cubic extrapolations in FIGS. 1C and 1D, on the other hand, show considerable improvements which for cubic extrapolation are already less than 10% deviation from the optimal value here. The relationships are also correspondingly better if values above the optimal value are estimated beforehand, so the safety tolerance can also be very much smaller.

It is desirable to estimate the optimal value of ion generation beforehand if, for this case of the rise in concentration at the base of the chromatographic peak, an exponential increase were assumed right from the beginning. Determination of the factor of increase resulting from the last measurements would be adequate to obtain a very accurate estimate of the optimal generation rate for the next ionization process.

The inventive method described herein is particularly designed for fast chromatography. Here it is assumed that chromatography uses thin capillaries which, at the beginning of the chromatogram, provide substance peaks with a half-value width of one second. Throughout the chromatogram the peaks become wider; as is known their width is directly proportional to the root of retention time.

Mass spectrometry in the ion trap is preferably restricted to a mass range from a mass of 50 u to 350 u. This covers all the high and medium volatility substances. At a scanning rate of 30,000 u/s (atomic mass units per second) the entire scan takes only 10 milliseconds.

The ion trap is preferably operated with internal ionization by an electron beam from outside. In the ion trap there are always inevitably certain background substances which consist of impurities in the collision gas or in the desorbed substances from the walls. Next, ionization by the ionizing electron beam is set so that at a maximum ionization time of 24 milliseconds the ion trap is not overridden with ions unless there are other substances in the ion trap apart from the background.

If one now adds 5 milliseconds for decelerating the ions in the ion trap after their ionization, plus 1 millisecond for the complete emptying of the ion trap after scanning, a total of 40 milliseconds is required for the entire process of scanning. Consequently, 25 spectra per second can be scanned.

Normally groups of 10 of these spectra are added together to form a sum spectrum. If a single spectrum is represented by about 10,000 ions, for the sum spectrum 100,000 ions will be available. Consequently, the dynamic measuring range is increased and now overlapping (non-separated) spectra of two substances can be scanned if their concentrations do not differ by more than a factor of about 10.

As long as only background is scanned, 2.5 sum spectra are therefore scanned per second. If a chromatographic peak now begins to form, initially an exponential growth is assumed by approximation. Since the width of the peak is approximately known due to its retention time, the growth factor is also known for every 40 milliseconds of duration. This growth factor is applied for the first points which lead out of the background noise; for the next measuring points the growth factor is corrected on the basis of the measurements.

Control of the number of ions in the ion trap is performed by shortening the ionization time. If the chromatographic peak now rises beyond 6 times the background concentration, ionization time is shortened to below 4 milliseconds. The rate for the complete scan is now shortened by software control from 40 to 20 milliseconds. The chromatographic peak is still very small and exponential growth can still be assumed.

If some measured values of the scanning rate of 20 milliseconds are now available, the type of precalculation can be converted for the estimated value of generation rate.

At this point let us suppose conversion to cubic extrapolation. For this the values for the integrated ion current of the past four spectra are used to form the first, second and third differential quotients, and from these the value of the future generation rate is then estimated by summation, based on the last measured value. (In fact not even the differential quotients have to be formed but only the differences because the intervals are the same, so calculation remains restricted to a few subtractions and additions).

These calculations are simple and can easily be performed in the millisecond which is required for emptying the ion trap.

Also beyond the chromatographic peak groups of 10 spectra are added to a form a sum spectrum. There are therefore 5 sum spectra per second available, or about 8 spectra beyond the main part of the peak. With this number of spectra for a peak it is possible to conduct excellent work. The number is even ideal for mathematical deconvolution of overlapping GC-peaks which it was not possible to completely separate by chromatography.

For practical reasons the ionization time can only be reduced to about 5 microseconds. Therefore the concentration in a chromatographic peak may rise to 5,000 times the concentration of the background before an override takes place. If the background is low, so that it is not adequate to fill the ion trap or if the intensity of the electron beam is set correspondingly higher, the chromatographic dynamic range can also be greater than 1:5,000.

I claim:

1. A method of obtaining a mass spectrum of a sample, which method comprises generating ions from the sample, storing the ions in an ion trap, and carrying out successive mass scans on ions stored in the ion trap, wherein the method includes the step of compensating for changes in concentration of the substance to be analysed by, measuring the integrated ion currents in successive mass scans, and thereby determining the ion generation rate, calculating the expected ion generation rate for a subsequent mass scan, by extrapolation of said generation rates thereby determined in at least two preceding mass scans, and controlling the ion generation process in dependence upon said calculated expected ion generation rate.

2. The method of claim 1 wherein the intensity of ion generation is maintained constant and the time of ion generation is controlled in dependence upon said calculated expected ion generation rate.

3. The method of claim 1 wherein the extrapolation is a linear extrapolation from two preceding scans.

4. The method of claim 1 wherein the extrapolation is a nonlinear extrapolation from more than two preceding scan.

5. The method of claim 1 wherein the extrapolation is calculated from a plurality of preceding scans by curve adaptation of a change function.

6. The method of claim 1 wherein the scan takes place by mass-sequential ion ejection using nonlinear resonances after dipolar excitation.

7. The method of claim 1 wherein the scan takes place by ion ejection using resonance with a dipolar or quadropolar applied alternating field.

8. The method of claim 1 wherein ion generation takes place within the ion trap.

9. The method of claim 1 wherein ion generation takes place outside the ion trap and the ions are introduced to the ion trap by ion-optical means.

10. The method of claim 1 wherein ionization takes place by electron impact.

11. The method of claim 1 wherein the ions are generated by chemical ionization.

12. The method of claim 1 wherein the ionization takes place by photons.

* * * * *